United States Patent [19]
Olson et al.

[11] Patent Number: 5,139,225
[45] Date of Patent: Aug. 18, 1992

[54] PNEUMATICALLY CONTROLLED MULTIPLE VALVE SYSTEM FOR FLUID TRANSFER

[75] Inventors: Steve H. Olson; Richard L. Peugh, both of Boise, Id.

[73] Assignee: Micron Technology, Inc., Boise, Id.

[21] Appl. No.: 771,898

[22] Filed: Oct. 7, 1991

Related U.S. Application Data

[63] Continuation of Ser. No. 609,337, Nov. 5, 1990, abandoned.

[51] Int. Cl.$^5$ .................................... F16K 31/126
[52] U.S. Cl. .................................... 251/61.2; 137/606; 251/335.2
[58] Field of Search .................... 137/606, 884; 251/335.2, 61.2, 31, 368, 63.5, 25

[56] References Cited

U.S. PATENT DOCUMENTS

| | | | |
|---|---|---|---|
| 2,683,580 | 7/1954 | Griswold | 251/31 |
| 3,217,742 | 11/1965 | Merrill | 251/25 X |
| 3,572,366 | 3/1971 | Wiggins | 251/61.2 X |
| 4,180,239 | 12/1979 | Valukis | 251/63.5 X |
| 4,290,450 | 9/1981 | Swanson | 137/606 |
| 4,592,534 | 6/1985 | Ueda et al. | 251/368 X |
| 4,657,048 | 4/1987 | Foster | 137/884 |
| 4,872,638 | 10/1989 | Thompson et al. | 251/335.2 X |
| 4,874,014 | 10/1989 | Grant et al. | 251/63.5 X |

FOREIGN PATENT DOCUMENTS 1115041 10/1961 Fed. Rep. of Germany ........ 251/31

*Primary Examiner*—Stephen M. Hepperle
*Attorney, Agent, or Firm*—Wayne E. Duffy

[57] ABSTRACT

A pneumatically controlled valve system is provided featuring simplified modular construction, reduction of moving parts, improved control of valve operation and increased resistance to corrosive effects of transfer fluid used with the valve. In this invention a 3-way valve system is described which has a valve body constructed of modules of polyvinylidene fluoride polymer (PVDF) removably and operably attached to each other in such a way as to removably contain and retain double diaphragm sliding valve stem assembly of known design which removably seals a fluorocarbon polymer (PTFE) stem to the PVDF seat integral to the valve body to close and open the valve fluid inlet ports and sealingly separates the pneumatic pressurizing gas from the transfer fluid. The operation of the valve is pneumatically controlled through specially designed, removably attached gas inlet and outlet ports with orifices of preselected lengths and internal diameters designed to affect the introduction rate of the pressurizing gas which drives the valve stem assembly by the deflection of the upper and lower diaphragms of the valve stem assembly, thus reducing shock to the valve system by rapid valve closure and possible damage to valve components.

1 Claim, 2 Drawing Sheets

PNEUMATICALLY CONTROLLED MULTIPLE VALVE SYSTEM FOR FLUID TRANSFER

This application is a continuation of application Ser. No. 609,337 filed Nov. 5, 1990, now abandoned.

BACKGROUND OF THE INVENTION

1. Field of the Invention

This invention relates to a pneumatically controlled multiple valve system used by the semiconductor and microcircuit industries in the operation of certain rinser-dryer systems during the processing of semiconductor wafers. 2. Description of the Invention Valves for transfer of fluids may be as simple or complicated as the task requires to meet a wide variety of pressure, temperature, flow and fluid requirements. In the semiconductor and microcircuit industries, where contaminants of molecular dimensions are of critical concern, the need for clean, reliable, precise, accurate and long lasting valves is self evident.

Current valves known to be used in the rinser-dryer equipment employed in semiconductor wafer manufacture generally are complicated in design, contain many parts made of a variety of metallic and non-metallic materials and often have a short operating life, due to failure of various components at various times. Also the closing operation of the valve often is abrupt, resulting in a "hammer" effect upon the fluid line leading into the valve. This places excessive and unnecessary strain on the valve and associated components and tends to promote valve failure.

Inspection of the current art and available commercial valves, such as the valve now used, and manufactured by Semi-Tool Corp. of Kalispell, Mont., indicates that a simple, reliable, durable valve as in the described invention, is highly desirable in operation of rinser/dryer equipment used in the semiconductor and microcircuit industries.

SUMMARY OF THE INVENTION

The general purpose of the present invention, which will be described subsequently in greater detail, is to provide a new and improved fluid multiple valve system which has all of the advantages of the prior art fluid valve systems and none of the disadvantages. To attain this, the present invention envisions the use of polymeric materials in the construction of the valve body and the internal operating mechanisms controlling the fluid flow. This choice is made to avoid the corrosive effects of many fluids on commonly used metallic valve bodies and metallic internal valve mechanisms and to reduce or eliminate valve failure therefrom. This invention also envisions the use of fewer and simpler operating parts, which will tend to reduce the chances for valve failure.

In this invention a 3-way valve is constructed which has a valve body composed of five appropriately shaped and operably and removably connected sections of polyvinylidene fluoride (PVDF) polymer material which contain, in proper internal relationship, to be described, two fluorocarbon polymer (PTFE) diaphragm assemblies, of known design, to enclose and control the movement of two cylindrical PVDF valve stems, whose axial movements regulate the flow of liquid through the valve. Each valve stem operates individually, sequentially or jointly, in a fully open or fully closed position, which is achieved by the selective and controlled application of gas pressure upon the opposing surfaces of the diaphragms, which, in turn, exert axial pressure upon the valve stems. This pressure is reinforced by the axial pressure of the transfer fluid upon the sealing faces of the valve stems. The valve stems are fully inclosed within the fluorocarbon polymer (PTFE) diaphragm assemblies and extend between the gas regions and the liquid regions, their cylindrical surfaces and axial movement being sealed circumferentially by suitable butadiene "O" rings, which separate the two gas filled regions of the valve from each other.

As mentioned above, the valve stems are actuated by selective, controlled application of gas pressure alternately upon opposing sides of the fluorocarbon polymer (PTFE) diaphragms which separate the liquid and gas phases within the valve body. When a fluorocarbon polymer (PTFE) the subsequent deflection of the diaphragm in direction of the pressure, and against one end (top) of the valve stem, causes an axial movement of the valve stem and the seating and sealing of the lower fluorocarbon polymer (PTFE) segment of the valve stem assembly, at the opposing end, against a mating PVDF face formed within the PVDF valve body and being a part of the fluid passageway of the valve. Such closing effectively stops the flow of fluid in any direction through that portion of the 3-way valve.

Alternatively, when the gas pressure is selectively applied to the internal (bottom) side of the diaphragm, after being released from the opposing side (top), the valve stem will be forced by the line pressure of the fluid to move axially from its seated position and allow fluid to pass through the valve.

In this invention the controlled application of pressure is achieved by the use of a "controlled leak means". Here this consists of small metal, serrated nipples of appropriate lengths and internal diameters, which are removably, operably and appropriately attached on one end, to a side port in the upper and lower chambers in the valve body containing the fluorocarbon polymer (PTFE) diaphragms. These are exposed to the gas phase and isolated from each other by the butadiene "O" rings. The internal volume of the upper segment of the valve body is selected to allow a slow increase of gas pressure. The gas pressure applied ranges generally from 30–40 psig. The internal diameter of the nipples range from 0.025"–0.030" and the length of the nipples approximates 0.50". When these nipples are removably, operably and fluidly connected to an external gas source, such as laboratory grade Nitrogen, the rate of introduction of the pressurizing gas and thus the rate of application of pressure upon the fluorocarbon polymer (PTFE) diaphragm and its rate of deflection, with resultant axial travel of the valve stem, determines the rate of closure of the valve. Thus regulated, the fluid flow is reduced in a controlled manner. This diminishes the probability of a "hammer" effect in the fluid line, which often occurs when the flow of an incompressible fluid, such as water, is stopped suddenly in a system comprised of rigid and fixedly mounted components.

In this invention the gas pressure applied to either of the opposing sides of the teflon diaphragms is relieved by shutting off the gas pressure externally, usually automatically, in a known manner, and allowing the confined gas to pass to the atmosphere through a fixed annular leak designed in the valve body. This leak is intended to permit a controlled rate of relief of gas pressure on the selected side of the fluorocarbon polymer (PTFE) diaphragm and appropriate movement of the valve stem in the operation of the valve system.

In the present application of this invention, the liquid being transferred is deionized water, which has a line pressure ranging from 60–70 psig.

From the above description it can be seen that this invention has very few moving parts, viz, four fluorocarbon polymer (PTFE) diaphragms and two PVDF valve stems. This design reduces the likelihood of valve component failure and increases the operating life of the valve.

DESCRIPTION OF THE PREFERRED EMBODIMENT

Figure 1:
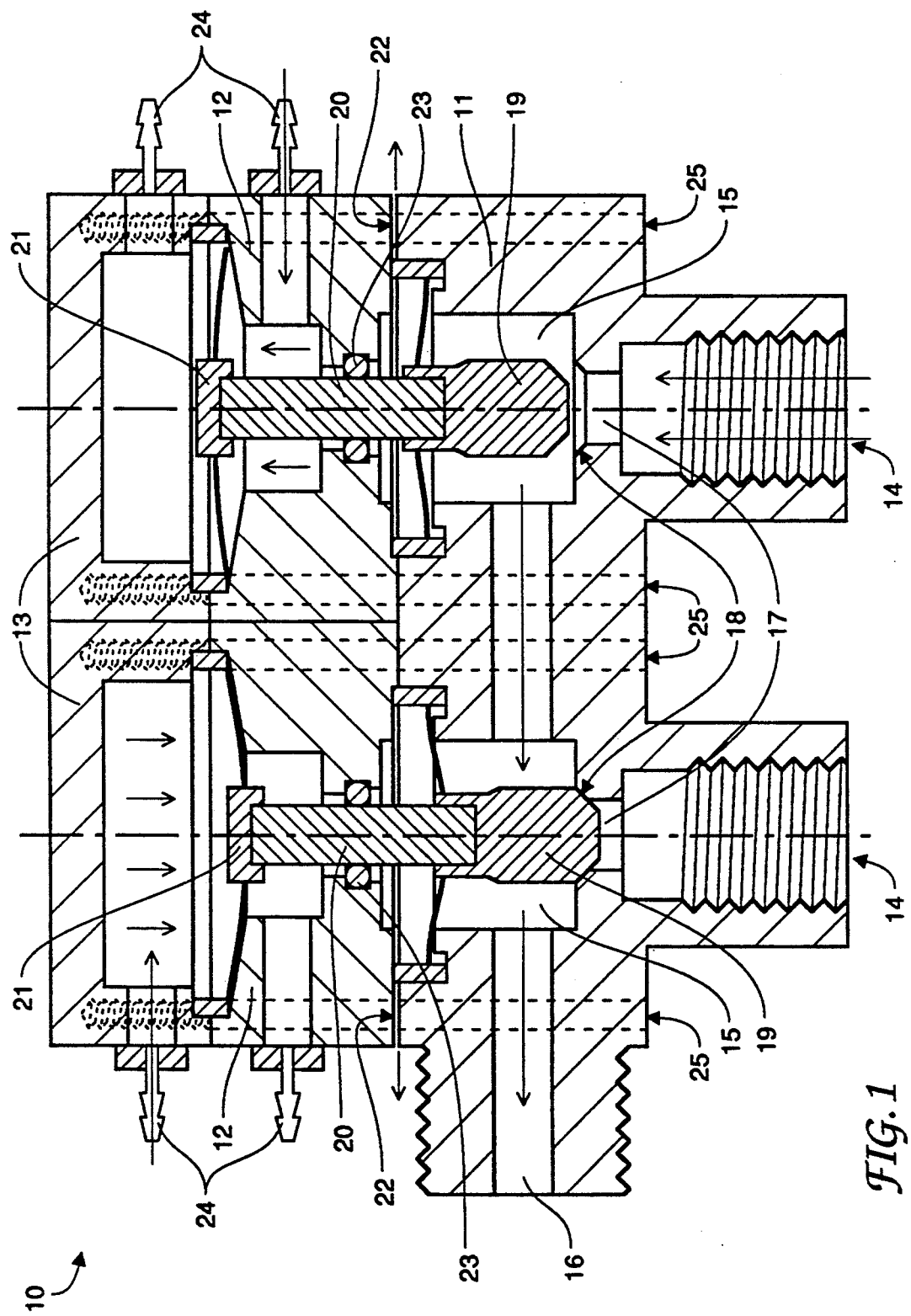
FIG. 1 is a cross sectional schematic diagram of the 3-way valve.

With reference now to the drawings and in particular to FIG. 1 thereof, a new and improved valve system embodying the principles and concepts of the present invention and generally designated by the reference numeral 10 will be described.

In this preferred embodiment the valve body parts 11, 12 and 13 are constructed from polymer polyvinylidene fluoride (PVDF) movably and operably connected to each other in a manner to be described.

With reference again to FIG. 1, the bottom part 11 or base of the valve body is of generally rectangular, box shape, having parallel opposing sides and parallel top and bottom, with two dimensionally identical, cylindrically shaped, fluid inlet ports 14, located laterally and appropriately on the bottom side of the base, with their central axes extending vertically in parallel spaced relationship. Each port 14 is appropriately threaded (shown here as female) to allow fluid connection to the fluid lines in the particular process in which the valve is being used, not described here. Directly above and connected by a short cylindrical passageway to each inlet port, and circumferentially located on the same inlet port central axes, are dimensionally identical cylindrical chambers 15, through which incoming fluid passes before leaving through cylindrically shaped exit ports 16. These exit ports 16 are located on a common axis intersecting and normal to both valve chambers and allow fluid flow in either direction within the valve body, depending upon the open or closed position of the individual valves in the valve body, to be discussed later.

Fluidly connecting each of the inlet ports 14 to each of the valve chambers 15 are two dimensionally identical cylindrical passageways 17, centrally located on the same vertical axes. These connecting passageways are of lesser internal diameter than the inlets ports 14 or the valve chambers 15. Where it intersects the bottom of the valve chambers 15, each connecting passageway is identically flared circumferentially and radially to its axis in the form of an inverted and truncated cone 18. This cone forms the female seat for the valve stem assembly to be described later.

Figure 3:
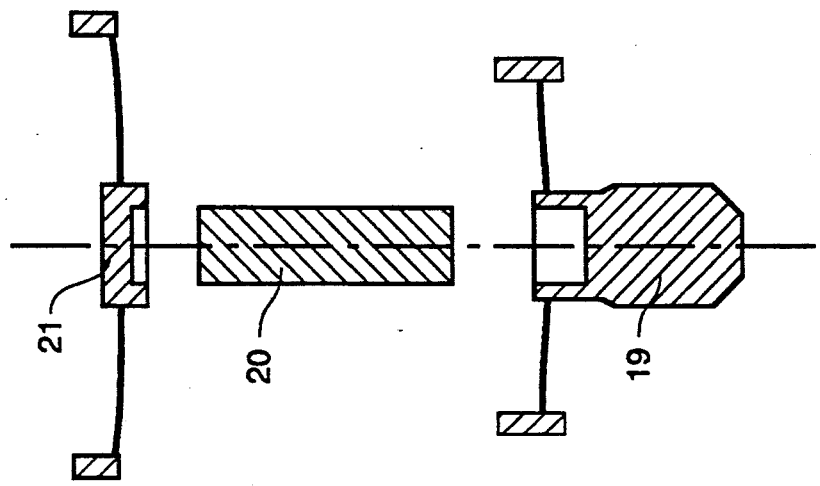
FIG. 3 is an exploded cross sectional view of the valve stem assembly.

At the top of the valve chamber 15 and upon the same cylindrical axes, an annular groove with a generally rectangular cross section is formed in the body of the valve base, with a slightly recessed inner shoulder. It is slightly larger in radius than the valve chamber, extends to the top, planar surface of the valve base and is designed to contain and confine the lower diaphragm of the valve stem assembly, described next. In this preferred embodiment the valve body contains two dimensionally identical valve stem assemblies, each comprising three separate parts 19, 20 and 21, as shown in FIG. 3. These are operably and removably connected to each other in the assembled valve as shown in FIG. 1.

Referring again to FIG. 3, the valve stem assembly is of an existing design, provided by Semi-Tool Corp. of Kalispell, Mont. The lower part 19 of the valve stem assembly is formed from a fluorocarbon polymer (PTFE) material commonly identified by the tradename Teflon. Its physical and chemical properties are well known and in this preferred embodiment it exhibits the desired characteristics of strength, toughness, durability, chemical resistance and resiliency necessary to serve as a valve closing mechanism. Part 19 is formed in a known manner to consist of a single piece having a solid cylindrically shaped center portion whose bottom end is shaped in the form of an inverted and truncated cone and designed to fit into the inverted conical (female) shape of the upper end 18. This action will seal the connecting passageway 17 between the inlet port 14 and the valve chamber 15 of the body base 11. Of existing design and extending radially from the central axis of the upper end of part 19 and being an integral part of it, is a thin diaphragm of fluorocarbon polymer (PTFE), having a circumferential, annular ring, with a rectangular cross section, forming the outer dimension of the part. This upper end of the central part of part 19 is recessed in a cylindrical cup shape to receive, in the manner of a friction fit, the lower end of part 20, which is a cylinder of PVDF polymer. This polymer is tough, rigid and has excellent wear characteristics suitable for this preferred embodiment. The upper part 21 is also formed as one piece of fluorocarbon polymer (PTFE), in a known manner, with the center portion being a short, cylindrical section with an inverted, cup shaped indentation in its bottom, to accept as a friction fit, the upper end of part 20. Parts 19, 20 and 21 are operably and removably attached to each other in a known manner. Also extending radially from the central axis of the part 21 and being an integral part of it, is a thin diaphragm of fluorocarbon polymer (PTFE), having a circumferential annular ring, with a rectangular cross section, which forms the outer dimension of the part.

Figure 2:
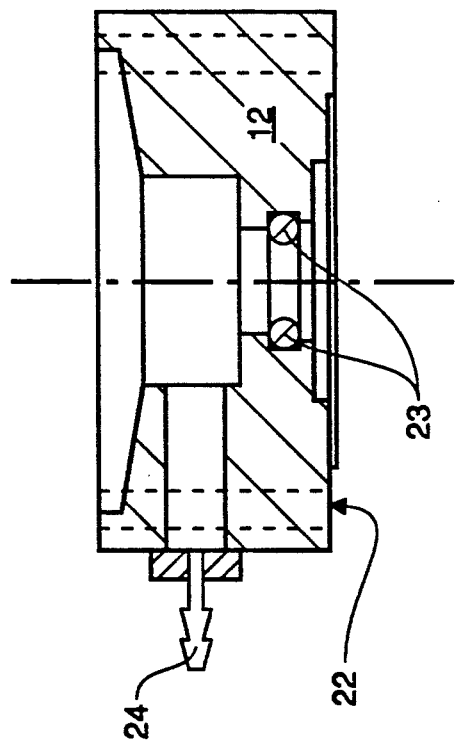
FIG. 2 is a cross sectional diagram of the midsection of the valve which holds the valve stem assembly.

Removably and operably attached to valve body base 11 are two dimensionally identical valve middle parts 12, which adjoin on one side, as shown in FIG. 1 and shown in FIG. 2. These parts 12 hold and support parts 19, 20 and 21, as will be described next.

Referring to FIG. 2, part 12 is constructed in a known manner from PVDF polymer material and is of generally rectangular, box shape, with parallel opposing sides and parallel top and bottom. Extending radially from the central axis of part 12, the bottom surface is recessed slightly to a radius sufficient to confine the upper, outer edge of the annular ring 19. This bottom side also has a V-shaped groove inscribed radially from the center to one outer edge to permit gas leakage and pressure relief during valve operation, to be described later. Operably connected to and directly above this slight recess and also extending radially from the central axis of part 12, is a slightly deeper recess of lesser diameter which serves as a relief volume for gas captured during valve operation. Next above, and operably connected to this relief volume and about the central axis is a short cylindrical volume. This circumferentially and slidingly incloses cylinder 20 of the valve stem assembly when the valve is assembled. Within this short cylindrical volume an annular, circumferential groove of generally rectangular cross section is cut into the wall of the cylinder to contain and confine appropriately an "O" ring 23, which, in the present embodiment is composed of butadiene rubber. The internal diameter of the "O" ring is selected to slidingly and circumferentially enclose the valve stem assembly cylindrical part 20 when the valve is assembled for use.

Extending directly above and operably connected to this short cylindrical volume is a larger cylindrical expansion volume which extends radially from the central axis to a greater radius than the preceding volume and has, operably and laterally connected to its sidewall, a cylindrical gas inlet port which passes normal to the central axis of part 12 through the sidewall of part 12. This inlet port has a serrated metal nipple 24 of appropriate length and internal diameter operably and removably connected to the external opening of the inlet port. This nipple 24 is designed to permit the controlled introduction of pressurizing gas into the expansion volume previously described.

The upper end of the expansion volume opens into a wider cylindrical opening whose radius is selected to circumferentially contain and confine the outer radius of part 21 of the valve stem assembly when the valve is assembled. The slightly curved surface extending radially from the upper edge of the expansion cylinder to the diameter of the part 21 is concave in shape to match and support the downwardly distended diaphragm of part 21 when gas pressure is applied to the upper surface of said diaphragm during valve operation.

Referring again to FIG. 1 top valve parts 13 consist of two dimensionally identical parts constructed in a known manner from PVDF polymer, of generally rectangular box shape, adjoining each other on one side, with parallel opposing sides and parallel top and bottom. These parts 13 are operably and removably connected to parts 12 and have the same central axes as parts 11 and 12, when the valve is assembled. Parts 13 have a cylindrical volume extending axially from for the open bottom of part 13 to a parallel plane just below the top surface, to form a generally inverted cup shape. Of slightly greater radius than the cylinder and designed to circumferentially confine and contain the outer annular ring of part 21 is a slightly recessed annular groove in the bottom surface of part 13. Essentially, this groove is symmetrical to the central axes and forms an open shoulder to support jointly with part 12, the annular ring of part 21 when the valve is assembled. Also, extending laterally through one exposed sidewall of part 13 is a pressurizing gas entry and exit port, to which is fluidly and removably attached a serrated metal nipple 24 of appropriate length and internal diameter. This nipple 24 is designed to permit the controlled introduction and release of pressurizing gas in and out of the expansion volume in a manner to be described.

The valve body parts 11, 12 and 13 are operably and removably held in fixed relationship to each other by multiple, removable threaded screws, which extend through a plurality of smooth, circumferential, cylindrical holes 25 in parts 11 and 12, on common axes to threaded holes in parts 14, where they are removably attached when the valve is assembled. Close tolerances are maintained.

Referring to FIG. 1, the operation of the valve 10 in this preferred embodiment may be summarized briefly as follows: This preferred embodiment is used in a rinser-dryer operation employed in certain semiconductor fabrication processes in the microcircuit manufacturing industry. The principal fluid being transferred is deionized water. However, the valve design and construction does not preclude its use for a large variety of other fluids, wherever appropriate. As may be seen from FIG. 1, each of the valve stem assemblies, which include parts 19, 20 and 21 may be pneumatically operated independently, consecutively or concurrently by selective application of the pressurizing gas to the diaphragm 21. In this embodiment Nitrogen is used. Application of gas pressure through nipple 24 to the top side of diaphragm 21 will depress the valve stem assembly downward to seat part 19 against the female mating conical section of valve body 11.

Each gas line controlling the flow of gas into the valve has a three position valve, not shown, usually solenoid operated, with an open, closed and exhaust port. This external valve permits the appropriate movement of the upper diaphragm when pressure is applied selectively to the top or bottom side of the diaphragm. The gas pressure used in this embodiment ranges from 30-40 psig.

The lower diaphragm of part 19 is exposed on its bottom side to the line pressure of the transfer fluid, which ranges from 60-70 psig. When the gas pressure is released from the top side of part 21 and gas pressure is applied, in a controlled manner, to its bottom side, through nipple 24, the valve stem assembly is lifted to open the valve. Any pressure which may be exerted by the transfer fluid entering the valve chamber 15 will also help to lift the valve stem. Any gas which may be trapped in the volume above part 19 will leak to the atmosphere through groove 22.

As can be seen from FIG. 1, the gas phase which operates the valve stem assembly and the liquid phase which is being transferred through the valve are separated physically by the sealing action of the circumferential ring of part 19, which serves as an "O" ring seal between part 11 and part 12. Also "O" ring 23 serves to separate the gas pressure relief volume above the diaphragm of part 19 and the expansion volume below the diaphragm of part 21. This seal permits the application of pressure to the bottom side of diaphragm 21 and the relief through leak 22 of pressure above the diaphragm of part 19, thus permitting upward movement of the valve stem assembly and the opening of the valve An important feature of this invention is the ability to control the rate of closing of the valve and thereby the suddenness or abruptness with which the valve stem seats against the body of the valve and stops the flow of the fluid being transported. This control is obtained by selecting the nature, temperature and pressure of the incoming gas, the internal diameter and length of the connecting nipple and the volume of the chamber into which the gas expands when it exerts downward pressure on the diaphragm 21. A change in any of these parameters will affect the rate of valve closure. A slow closure will minimize the "hammer" effect of sudden stoppage of an incompressible fluid such as water and virtually eliminate significant physical shock to any connecting valve components, fittings or fluid transfer lines, thus reducing possible damage from such shock.

As seen from the above description the valve stem assembly is the only moving part in this valve and it is actuated by a controlled introduction of pressurizing gas through fixed leaks which are designed to introduce the gas at a reproducible rate which, in turn, determines the rate of distortion of the valve diaphragm and subsequent rate of travel of the valve stem and closure of the valve. With the exception of the precision made nipples used for the controlled introduction of the pressurizing gas, all parts are fabricated from polymeric materials which resist corrosive fluids and are durable, tough and resilient, all desirable characteristics for a valve designed for long, dependable use.

The present invention has been fully described in a preferred embodiment but many modifications and variations may become apparent to those skilled in the art. However, the scope of the present invention is not limited by the above described details, but only by the terms of the appended claims.

We claim:

1. A rate controllable pneumatic pressure operated valve system for the controllable transfer and interruption of transfer of fluids to reduce system shock, the system comprising:
   a. a valve body base component, of known composition, having a plurality of internal chambers fluidly and operably connected to each other by a known transfer fluid, through a plurality of integral fluid inlet and outlet ports configured to sealingly, removably and operably contain the circular lower diaphragm and integral cylindrical sealing stems of a plurality of existing valve stem assembly components;
   b. said plurality of existing valve stem assembly components, of known design and composition, consisting of a plurality of circular upper and lower diaphragms, each with a top side and a bottom side, removably connected appropriately by a plurality of cylindrical connecting stems and with an integral cylindrical sealing stem extending axially from the lower diaphragm, for the purpose of controllably opening and sealingly closing the fluid valve inlet and outlet ports in the valve body base component and to sealingly isolate and separate the transfer fluid from the valve operating pneumatic pressure;
   c. a middle valve body component of known composition, removably and operably attached to said valve body base component and sealingly and removably containing and confining a plurality of existing valve stem assembly components and having a plurality of rate controllable pneumatic pressure inlet and outlet ports removably attached which are selectively designed to controllably relieve pneumatic pressure above the lower diaphragm and control the rate of change of externally supplied pneumatic pressure on the bottom side of the upper diaphragm of the existing valve stem assembly component, thereby controlling the rate of opening and closing of the valve and reducing system shock;
   d. a top valve body component of known composition, having a plurality of internal chambers, removably and operably attached to said middle valve body component and having a plurality of rate controllable pneumatic pressure inlet and outlet ports removably attached which are selectively designed to control the rate of change of externally supplied pneumatic pressure on the top side of the upper diaphragm of the existing valve stem assembly component, thereby controlling the rate of opening and closing the valve and reducing system shock; and
   e. said integral sealing valve stem is removably and sealably and slidingly contained and retained by a suitable "O" ring means, of known composition, sealably and removably attachable to the middle valve body component for the purpose of separating the pneumatic pressure below the upper diaphragm from the pneumatic pressure above the lower diaphragm of the existing valve stem assembly.

* * * * *